United States Patent [19]

Raemy et al.

[11] Patent Number: 5,932,272
[45] Date of Patent: Aug. 3, 1999

[54] PROCESS FOR PREPARING A FOOD GEL

[75] Inventors: Alois Raemy, La Tour-De-Peilz, Switzerland; Paulo Fernandes, Amiens, France

[73] Assignee: Nestec, S.A., Vevey, Switzerland

[21] Appl. No.: 08/675,533

[22] Filed: Jul. 3, 1996

[30] Foreign Application Priority Data

Jul. 7, 1995 [EP] European Pat. Off. .............. 95810451

[51] Int. Cl.$^6$ ................................. A23L 1/04; A23C 21/00
[52] U.S. Cl. ..................... 426/573; 426/575; 426/577; 426/579; 426/583
[58] Field of Search ....................... 426/573, 574, 426/575, 576, 577, 578, 579, 583

[56] References Cited

U.S. PATENT DOCUMENTS

| | | | |
|---|---|---|---|
| 3,640,461 | 2/1972 | Koll | 239/7 |
| 3,689,288 | 9/1972 | Duren | 99/139 |
| 3,720,288 | 3/1973 | Tschabold | 184/6.4 |
| 3,735,199 | 5/1973 | Ascoli | 317/3 |
| 3,891,778 | 6/1975 | Boyer | 426/523 |
| 3,937,445 | 2/1976 | Agosta | 259/4 R |
| 4,066,011 | 1/1978 | Ballentine | 99/467 |
| 4,127,332 | 11/1978 | Thiruvengadam et al. | 366/131 |
| 4,251,562 | 2/1981 | Le Grand et al. | 426/573 |
| 4,276,320 | 6/1981 | Moirano | 426/575 |
| 4,362,761 | 12/1982 | Chang et al. | 426/657 |
| 4,375,481 | 3/1983 | Kawabara et al. | 426/93 |
| 4,623,552 | 11/1986 | Rapp | 426/575 |
| 5,011,701 | 4/1991 | Baer et al. | 426/573 |
| 5,100,688 | 3/1992 | Cox et al. | 426/573 |
| 5,104,674 | 4/1992 | Chen et al. | 426/575 |
| 5,205,648 | 4/1993 | Fissenk | 366/177 |
| 5,208,050 | 5/1993 | Ney | 425/202 |
| 5,217,741 | 6/1993 | Kawachi et al. | 426/573 |
| 5,221,504 | 6/1993 | Capelle | 264/211.23 |
| 5,232,722 | 8/1993 | Obara et al. | 426/104 |
| 5,252,352 | 10/1993 | Barach et al. | 426/580 |
| 5,291,877 | 3/1994 | Conde-Petit et al. | 127/33 |
| 5,372,835 | 12/1994 | Little et al. | 426/573 |
| 5,532,018 | 7/1996 | Miller et al. | 426/582 |
| 5,629,037 | 5/1997 | Gaffney | 426/36 |

FOREIGN PATENT DOCUMENTS

| | | |
|---|---|---|
| 0429966A2 | 6/1991 | European Pat. Off. . |
| 0668026A1 | 8/1995 | European Pat. Off. . |
| 2703566 | 10/1994 | France . |
| 5339299 | 12/1993 | Japan . |
| 686646 | 3/1994 | Japan . |

OTHER PUBLICATIONS

*Perry's Chemical Engineers' Handbook*, 6th ed. McGraw Hill Book Co., NY, NY pp. 5–6, 5–9, 1984.
Webb et al, *Fundamentals of Dairy Chemistry*, Avi Publishing Co., Westport, CT pp. 54–57, 1965.
Patent Abstracts of Japan, vol. 18, No. 344(C–1218), Abstract of Watanabe, Japanese Patent Document No. JP–A–6086646 (1994).
Patent Abstracts of Japan, vol. 18, No. 182(C–1184), Abstract of Kawasaki, et al., Japanese Patent Document No. JP 5 339 299 (1994).
Patent Abstracts of Japan, vol. 12, No. 398(C–538), Abstract of Tamaoki, et al., Japanese Patent Document No. JP–A–63 141 566 (1988); and Gekko, et al., "Effect of Pressure on the Sol–Gel Transition of Carrageenans", Int. J. Biol. Macromol., vol. 7, pp. 299–305, Oct. 1985.

*Primary Examiner*—Cynthia L. Nessler
*Attorney, Agent, or Firm*—Vogt & O'Donnell, LLP

[57] ABSTRACT

A food gel composition is obtained by preparing an aqueous sol of lactoserum proteins and a polysaccharide so that, by weight based upon the sol weight, the lactoserum proteins are in an amount of from 5% to 15% and so that the polysaccharide is in an amount of from 0.05% to 0.25%, and then the sol is subjected to a hydrostatic pressure of from 200 MPa to 800 MPa for from 1 minute to 20 minutes.

17 Claims, No Drawings

PROCESS FOR PREPARING A FOOD GEL

BACKGROUND OF THE INVENTION

The present invention relates to a gel containing at least one polysaccharide and to a process for the preparation of such a gel.

Various applications of the technology of high hydrostatic pressures for the treatment of food products are known.

European Patent Application Publication No. 0 429 966 (KK MEIDI-YA SHOKUHIN KOJO), for example, describes the application of a high hydrostatic pressure treatment to fruit-based products such as marmalades, jellies, compotes or purees, with the aim of ensuring that the colour and taste of the fruits entering into their composition are conserved without having to subject them to a heat treatment.

French Patent Application Publication No. 2 703 566 (OVI S.A. and SOCIETE FALIERE FOIES GRAS) describes a process for the treatment of foie gras by high hydrostatic pressure under cold conditions, in order to avoid the melting of lipids which would be caused by a traditional heat treatment, for the purpose of conserving it.

European Patent Application (i.e. supply initial capitalization) No. 94102349.1 describes a process for the manufacture of cooked pork meats such as frankfurters with a low fat content, which comprises an intermediate treatment at high hydrostatic pressure.

U.S. Pat. No. 5,129,877 describes a process for the manufacture of a food gel, in which an aqueous mixture is prepared containing all the ingredients which are to enter into the composition of the gel, including an emulsifier in dispersion and a starch rich in amylose which is gelatinized under conditions which make it possible to release a suitable amount of amylose, this amylose is complexed under hot conditions with the emulsifier and the mixture is made to set by cooling.

SUMMARY OF THE INVENTION

The aim of the present invention is to provide a process which makes it possible to prepare a food gel which is of suitable elasticity and viscosity, without the need to involve a step of heating at a relatively high temperature, as well as the gel obtained by this process.

Accordingly, in the process for the preparation of a gel according to the present invention, a sol is prepared containing all the ingredients which are to enter into the composition of the gel, including at least one polysaccharide and lactoserum proteins, and the sol is made to set by subjecting it to a hydrostatic pressure of 200–800 MPa. The gel and sol are prepared so that the gel has, by weight, a lactoserum protein content of from 5% to 15% and a polysaccharide content of from 0.05% to 0.25%.

The gel according to the present invention thus contains at least one polysaccharide and lactoserum proteins, and it has a storage modulus G' of 2–$10^5$ Pa as well as a loss modulus G" of 1–$10^4$ Pa.

DETAILED DESCRIPTION OF THE INVENTION

It has been observed, surprisingly, that it was possible to make a sol set to a gel, this sol containing at least one polysaccharide, in particular kappa-carrageenan, and lactoserum proteins, by subjecting it to a high hydrostatic pressure treatment, although the effect of such a treatment on a gel containing a polysaccharide such as kappa-carrageenan, for example, is known to be negative.

Indeed, it is known from K. Gekko and K. Kasuya, Int. J. Biol. Macromol. 7, 299 (1985) that a high hydrostatic pressure treatment brings about a lowering of the melting point of a kappa-carrageenan gel, this lowering being proportional to the pressure applied.

It has also been observed that the present process makes it possible to prepare a gel of elasticity and viscosity which are variable over wide ranges, as a function of the concentration of polysaccharide and proteins in the sol, the pressure applied and the temperature during the treatment. It has been observed, generally, that the more these different variables take high values, the higher is the firmness of the gel.

In the present account, the firmness of the gels is thus defined by means of the parameters "storage modulus" G', which characterizes the elasticity, and the "loss modulus" G", which characterizes the viscosity. These parameters are determined under a harmonic regime. The sample is subjected to a sinusoidal deformation or stress at a determined frequency. The corresponding shear stress is measured, itself being sinusoidal but having a phase shift between the extremes zero (purely elastic texture) and $\pi/2$ (purely viscose texture). An intermediate phase shift has an elastic component, namely the storage modulus G', and a viscose component, namely the loss modulus G".

The present account talks of a strong gel when its storage modulus G' and loss modulus G" are at the top of the respective fields defined above, in particular when G' takes a value of 100–$10^5$ Pa and when G" takes a value of 10–$10^4$ Pa. Similarly, the account talks of a weak gel when its moduli take values of between 2 and less than 100 Pa for G' and between 1 and less than 10 Pa for G".

A strong gel may have a lactoserum protein content of about 12–15% by weight and a polysaccharide content of about 0.1–0.25% by weight, for example.

A weak gel may have a lactoserum protein content of about 5–12% by weight and a polysaccharide content of about 0.05–0.1% by weight, for example.

The lactoserum proteins, in particular those of a lactoserum by-product of a manufacture of cheese from cow's milk, may be of greater or lesser purity depending on the manner in which they have been recovered or isolated from the lactoserum, in particular by precipitation, filtration, ultrafiltration and/or diafiltration, for example. They preferably have a purity of at least 50%.

The polysaccharide may be chosen from a group comprising kappa-carrageenan, xanthan and/or pectin, for example. It has been found that the firmness of the gel may vary more or less as a function of the choice of polysaccharide, according to the temperature at which the high hydrostatic pressure treatment is performed.

In a preferred embodiment of the present invention, the gel may include in particular, in addition to the lactoserum proteins and the polysaccharide, traditional ingredients in the preparation either of desserts of the flan or pudding type, or of jellies of the aspic type or of meat substitutes, such as other milk solids, up to 10% by weight of sucrose, meat extracts, stock bases and/or flavouring and/or colouring substances, for example.

In order to carry out the process according to the present invention, a sol is thus prepared containing all the ingredients which are to enter into the composition of the gel, namely at least one polysaccharide, lactoserum proteins and other optional complementary ingredients, such as those mentioned above for a particular embodiment of the pudding type, for example.

In order to prepare the said sol, the polysaccharide, the lactoserum proteins and the possible optional ingredients may be dissolved in aqueous solution simultaneously or separately, and the solution may be stirred, for example.

The pH of the solution before stirring is preferably neutral, that is to say from 6.0–7.5, for example.

In order to perform the high hydrostatic pressure treatment, the sol may be conditioned in sachets or plastic cups, in particular in yoghurt pots sealed with aluminium foil, for example, before placing them in the treatment chamber of a commercial machine in which they will be subjected to the high hydrostatic pressure, at the desired temperature and over the desired period.

The sol may thus be subjected to a hydrostatic pressure of 200–800 MPa at a temperature of 5–75° C. for 1–20 min, for example.

In order to obtain a strong gel, the sol is preferably subjected to a hydrostatic pressure of 400–800 MPa at a temperature of 50–75° C.

In order to obtain a weak gel, the sol is preferably subjected to a hydrostatic pressure of from 200 MPa to less than 400 MPa at a temperature of from 5° C. to less than 50° C.

EXAMPLES

The examples which follow are presented by way of illustration of the gel and of the process for its preparation according to the present invention. The percentages and parts therein are given by weight except where otherwise mentioned.

In these examples, the machine used to subject the various sols to a high hydrostatic pressure is a National Forge Europe press (Belgium) for pressures of between 200 and less than 400 MPa and an ABB press with a useful volume of 1.4 l for pressures of between 400 and 800 MPa.

The lactoserum proteins are an isolate having a purity of 90%, marketed by the company Le Seur Isolates (GB) The kappa-carrageenan is a product marked by the company Fluka (CH). The xanthan is a product marketed by the company Xanthan Jungbunzlauer (DE). The pectin is a product extracted from lemon, marketed under the brand name HM-PECTIN by the company Fluka (CH).

In order to prepare the sol, the proteins are dissolved in distilled water at room temperature and the pH is adjusted to 7.0 by addition of 0.1 M HCl or 0.1 M KOH. The polysaccharides are dissolved by dispersing them in water at room temperature while stirring gently for 1 h, followed by heating at 90° C. for 30 min with stirring. The protein solution is mixed with the polysaccharide solution in the desired proportions at room temperature, with stirring for 30 min. If necessary, the pH is again adjusted to 7.0.

The storage modulus G' and loss modulus G" are determined using a constant-force rheometer (Carri-Med CS-100) using a measuring device formed of a cone rotating on a plate, cone and plate having a diameter of 6 cm and the angle between the cone and the plate being 4°. The measurements are taken at 25° C., at several frequencies of oscillation of the cone about its axis chosen within the range 0.1–10 Hz, under a couple with an amplitude of 0.01 Nm, a value selected within a linear field of viscosity.

Example 1

A sol containing 12% of lactoserum proteins and 0.1% of kappa-carrageenan is prepared. This sol is divided into several aliquots which are subjected to various hydrostatic pressures of between 200 and less than 400 MPa, for different periods of time of between 6 and 12 min, and at room temperature.

The conditions of these tests and the results of the firmness measurements (elasticity and viscosity defined by the storage modulus G' and loss modulus G") of the gels obtained are collated in Table 1 below, in which the values of G' and G" of the non-pressurized sol are also indicated for comparison:

TABLE 1

| Test No. | Duration (min) | Pressure (MPa) | G' (Pa) | G" (Pa) |
|---|---|---|---|---|
| compar. | 0 | 0 | 5 | 3.0 |
| 1.01 | 6 | 200 | 18 | 3.0 |
| 1.02 | 6 | 250 | 27 | 2.8 |
| 1.03 | 6 | 300 | 17 | 5.0 |
| 1.04 | 6 | 350 | 19 | 3.3 |
| 1.05 | 6 | 380 | 25 | 3.2 |
| 1.06 | 9 | 200 | 18 | 4.5 |
| 1.07 | 9 | 250 | 23 | 5.5 |
| 1.08 | 9 | 300 | 17 | 5.0 |
| 1.09 | 9 | 350 | 26 | 4.0 |
| 1.10 | 9 | 380 | 27 | 3.8 |
| 1.11 | 12 | 200 | 18 | 2.0 |
| 1.12 | 12 | 250 | 24 | 5.0 |
| 1.13 | 12 | 300 | 25 | 5.2 |
| 1.14 | 12 | 350 | 27 | 3.0 |
| 1.15 | 12 | 380 | 26 | 3.2 |

It is seen in this table that the storage modulus G' of the weak gel obtained by high pressure treatment at room temperature of this sol containing 12% of lactoserum proteins and 0.1% of kappa-carrageenan has a value which generally increases with pressure between 200 and 380 MPa, whereas the loss modulus G" has an optimum value at pressures of between 250 and 350 MPa. This behaviour is very much the same irrespective of the exact period of the treatment in this 6–12 min range.

The delicate texture of these gels predisposes them to use in the preparation of desserts of the flan or pudding type, for example.

Examples 2–4

Three sols each containing 12% of lactoserum proteins and 0.1% of one of the three polysaccharides—kappa-carrageenan, xanthan and pectin—are prepared. These sols are divided into several aliquots which are subjected to various hydrostatic pressures of between 400 and 800 MPa, for 10 min at 50° C.

The conditions of these tests and the results of the firmness measurements (elasticity and viscosity defined by the storage modulus G' and loss modulus G") of the gels obtained are collated in Table 2 below:

| Test No. | Polysaccharide | Pressure (MPa) | G' (Pa) | G" (Pa) |
|---|---|---|---|---|
| 2.1 | kappa-carrageenan | 400 | 100 | 20 |
| 2.2 | kappa-carrageenan | 600 | 250 | 60 |
| 2.3 | kappa-carrageenan | 800 | 470 | 110 |
| 3.1 | xanthan | 600 | 150 | 35 |
| 3.2 | xanthan | 800 | 300 | 65 |
| 4.1 | pectin | 600 | 250 | 40 |
| 4.2 | pectin | 800 | 300 | 50 |

It is seen in this table that the storage modulus G' and loss modulus G" of the strong gels obtained by high pressure treatment at 50° C. for 10 min of these sols containing 12% of lactoserum proteins and 0.1% of kappa-carrageenan, xanthan or pectin have a value which generally increases with pressure between 400 and 800 MPa.

The remarkable firmness of these gels predisposes them to use in the preparation of aspics or meat substitutes, for example.

Example 5

A sol is prepared containing the following ingredients in the proportions indicated in %:
lactoserum protein 12.0
kappa-carrageenan 0.1
sucrose 6.0
vanillated sucrose 2.0
cocoa powder 4.0
powdered skimmed milk 3.0
water: difference to 100

This sol is subjected to a pressure of 250 MPa for 9 min at room temperature. A chocolate flan or pudding having a storage modulus G' of 35 Pa and a loss modulus G" of 8 Pa is thus obtained. It is distinguished by a pleasant texture in the mouth, namely a texture which is, at the same time, smooth, creamy and crisp.

Example 6

A sol is prepared containing the following ingredients in the proportions indicated in %:
lactoserum protein 12.0
pectin 0.1
meat extract 3.0
salt 2.0
water: difference to 100

This sol is subjected to a pressure of 800 MPa for 10 min at 50° C. A meat substitute having a storage modulus G' of 250 Pa and a loss modulus G" of 60 Pa is thus obtained. It is distinguished by a firm and crisp texture in the mouth which is particularly appreciable in sub-divided form.

We claim:

1. A process for preparing a gel composition comprising preparing an aqueous sol comprising lactoserum proteins and a polysaccharide selected from the group consisting of kappa-carrageenan, xanthan and pectin so that, by weight based upon the sol weight, the lactoserum proteins are in an amount of from 5% to 15% and so that the polysaccharide is in an amount of from 0.05% to 0.25% and then subjecting the sol to a hydrostatic pressure of from 200 MPa to 800 MPa and to a temperature of from 5° C. to 75° C. for from 1 minute to 20 minutes.

2. A process according to claim 1 wherein the sol is subjected to the hydrostatic pressure for from 6 minutes to 12 minutes.

3. A process according to claim 1 wherein the sol is subjected to a hydrostatic pressure of from 400 MPa to 800 MPa and at a temperature of from 50° C. to 75° C.

4. A process according to claim 3 wherein the sol is prepared so that, by weight based upon sol weight, the lactoserum proteins are in an amount of from about 12% to 15% and so that the polysaccharide is in an amount of from 0.1% to 0.25%.

5. A process according to claim 1 wherein the sol is subjected to a hydrostatic pressure of from 200 MPa to 400 MPa and at a temperature of from 5° C. to 50° C.

6. A process according to claim 5 wherein the sol is prepared so that, by weight based upon the sol weight, the lactoserum proteins are in an amount of from about 5% to 12% and so that the polysaccharide is in an amount of from about 0.05% to 0.1%.

7. A process according to claim 1 wherein the polysaccharide is kappa-carrageenan.

8. A process according to claim 1 further comprising placing the lactoserum proteins and the polysaccharide simultaneously in water and stirring to prepare the sol.

9. A process according to claim 1 further comprising placing the lactoserum proteins and the polysaccharide sequentially in water and stirring to prepare the sol.

10. A process according to claim 9 wherein the lactoserum proteins first are placed and stirred in the water to obtain a lactoserum-containing solution and then the polysaccharide is placed in the lactoserum-containing solution and stirred to obtain the sol.

11. A process according to claim 1 further comprising placing the lactoserum proteins in water and stirring to obtain a lactoserum-containing solution and separately placing the polysaccharide in water to obtain a polysaccharide-containing solution and then combining the lactoserum-containing solution and the polysaccharide-containing solution and stirring to obtain the sol.

12. A process according to claim 10 or 11 wherein the water in which the lactoserum proteins are placed is distilled water.

13. A process according to claim 1 wherein the pH of the sol is adjusted to a pH of from 6.0 to 7.5.

14. A process according to claim 1 further comprising preparing the sol so that the aqueous sol contains up to 10% by weight sucrose.

15. A process according to claim 1 further comprising preparing the sol so that the aqueous sol contains milk solids.

16. A process according to claim 1 wherein the sol subjected to the hydrostatic pressure is contained in a sachet.

17. A process according to claim 1 wherein the sol subjected to the hydrostatic pressure is contained and sealed in a plastic cup.

* * * * *